US012643035B2

(12) United States Patent
Timmins et al.

(10) Patent No.: US 12,643,035 B2
(45) Date of Patent: Jun. 2, 2026

(54) INFINITE DRAG AND SWIPE U TURN

(71) Applicant: Bungie, Inc., Bellevue, WA (US)

(72) Inventors: Luke Timmins, Bellevue, WA (US);
Gregory Peng, Bellevue, WA (US);
Elizabeth M.E. Chung, Bellevue, WA
(US); James Levasseur, Bellevue, WA
(US)

(73) Assignee: **SONY INTERACTIVE
ENTERTAINMENT LLC**, San Mateo,
CA (US)

( * ) Notice: Subject to any disclaimer, the term of this
patent is extended or adjusted under 35
U.S.C. 154(b) by 227 days.

(21) Appl. No.: 18/281,274

(22) PCT Filed: Mar. 10, 2022

(86) PCT No.: PCT/US2022/019681
§ 371 (c)(1),
(2) Date: Sep. 8, 2023

(87) PCT Pub. No.: WO2022/192492
PCT Pub. Date: Sep. 15, 2022

(65) Prior Publication Data
US 2024/0149146 A1 May 9, 2024

Related U.S. Application Data

(60) Provisional application No. 63/158,947, filed on Mar.
10, 2021.

(51) Int. Cl.
*A63F 13/2145* (2014.01)
*G06F 3/04886* (2022.01)

(52) U.S. Cl.
CPC ...... *A63F 13/2145* (2014.09); *G06F 3/04886*
(2013.01)

(58) Field of Classification Search
CPC ...... A63F 13/20; A63F 13/2145; A63F 13/42;
A63F 13/422; A63F 13/426; A63F 13/44;
(Continued)

(56) References Cited

U.S. PATENT DOCUMENTS

2005/0176502 A1 8/2005 Nishimura et al.
2007/0060335 A1 3/2007 Sakaguchi et al.
(Continued)

FOREIGN PATENT DOCUMENTS

AE P6002241/2023 9/2023
AE P6002244/2023 9/2023
(Continued)

OTHER PUBLICATIONS

Australian Application No. 2022234961, Second Examination Report
dated Aug. 16, 2024.
(Continued)

*Primary Examiner* — Lawrence S Galka
(74) *Attorney, Agent, or Firm* — Kilpatrick Townsend &
Stockton LLP

(57) ABSTRACT

Described herein are techniques for implementing dynamic
movement control on a virtualized physical controller, com-
prising receiving, on a touch-screen display, an indication of
a first touch input received from a user at a first location,
determining, based at least in part on a distance between the
first location and a second location associated with an origin
point for an input mechanism being less than a threshold
distance value, that a persistent directional input has been
initiated, maintaining the persistent directional input as long
as touch input is continuously detected, and while the
persistent directional input is maintained: monitoring a
touch input vector associated with the persistent directional
input, upon detecting an angular change in the touch input
vector that is greater than a threshold change value, deter-
(Continued)

mining that a reversal input has been provided, and causing the avatar to perform a reversal action corresponding to the reversal input.

20 Claims, 8 Drawing Sheets

(58) Field of Classification Search
CPC . G06F 3/0488; G06F 3/04883; G06F 3/04886
See application file for complete search history.

(56) References Cited

U.S. PATENT DOCUMENTS

| | | |
|---|---|---|
| 2009/0181770 A1 | 7/2009 | Viner et al. |
| 2009/0191968 A1 | 7/2009 | Johnson et al. |
| 2010/0248843 A1 | 9/2010 | Karsten |
| 2014/0187328 A1 | 7/2014 | Reynolds et al. |
| 2015/0072784 A1 | 3/2015 | Lee |
| 2016/0287990 A1 | 10/2016 | Garvin et al. |
| 2017/0340959 A1 | 11/2017 | Tang et al. |
| 2018/0043254 A1* | 2/2018 | Soejima ................ G06F 3/0488 |
| 2020/0174618 A1 | 6/2020 | Wang et al. |
| 2020/0179805 A1 | 6/2020 | Miao |
| 2020/0282308 A1 | 9/2020 | Guo et al. |
| 2020/0289933 A1 | 9/2020 | Seropian et al. |
| 2020/0298104 A1 | 9/2020 | Wang |
| 2022/0291829 A1* | 9/2022 | Kim ...................... G06F 3/0412 |
| 2024/0149147 A1 | 5/2024 | Peng |
| 2024/0207720 A1 | 6/2024 | Peng |

FOREIGN PATENT DOCUMENTS

| | | |
|---|---|---|
| AE | P6002248/2023 | 9/2023 |
| AU | 2022232383 | 9/2023 |
| AU | 2022234308 | 9/2023 |
| AU | 2022234961 | 9/2023 |
| CA | 3212868 | 9/2023 |
| CA | 3212970 | 9/2023 |
| CA | 3212972 | 9/2023 |
| CN | 108635850 | 10/2018 |
| CN | 112261973 | 1/2021 |
| CN | 202280019768.6 | 9/2023 |
| CN | 202280020263.1 | 9/2023 |
| CN | 202280020310.2 | 9/2023 |
| CN | 116964550 | 10/2023 |
| CN | 116964552 | 10/2023 |
| CN | 117043736 | 11/2023 |
| EP | 22767943.8 | 9/2023 |
| EP | 22767945.3 | 9/2023 |
| EP | 22767958.6 | 9/2023 |
| EP | 4288860 | 12/2023 |
| EP | 4291975 | 12/2023 |
| EP | 4291976 | 12/2023 |
| IL | 305742 | 9/2023 |
| IL | 305743 | 9/2023 |
| IL | 305749 | 9/2023 |
| JP | 2005-218778 | 8/2002 |
| JP | 2015-123244 | 7/2015 |
| JP | 2015-231545 | 12/2015 |
| JP | 2016-201028 | 12/2016 |
| JP | 2017-012423 | 1/2017 |
| JP | 2018-086275 | 6/2018 |
| JP | 2018-097649 | 6/2018 |
| JP | 2018-161446 | 10/2018 |
| JP | 2019-150269 | 9/2019 |
| JP | 2019-212119 | 12/2019 |
| JP | 2020-028652 | 2/2020 |
| JP | 2020-192239 | 12/2020 |
| JP | 2021000192 A | 1/2021 |
| JP | 2023-553638 | 9/2023 |
| JP | 2023-553639 | 9/2023 |
| JP | 2023-554299 | 9/2023 |
| JP | 2024-511304 | 3/2024 |
| JP | 2024-513669 | 3/2024 |

| | | |
|---|---|---|
| JP | 2024-513672 | 3/2024 |
| KR | 20130027621 A | 3/2013 |
| KR | 10-2014-0077991 | 6/2014 |
| KR | 10-1411684 | 6/2014 |
| KR | 20140127931 A | 11/2014 |
| KR | 20200091897 A | 7/2020 |
| MX | MX/a/2023/010550 | 9/2023 |
| MX | MX/a/2023/010552 | 9/2023 |
| MX | MX/a/2023/010553 | 9/2023 |
| NZ | 803788 | 9/2023 |
| NZ | 803836 | 9/2023 |
| NZ | 803844 | 9/2023 |
| RU | 2023124994 | 9/2023 |
| RU | 2023124995 | 9/2023 |
| RU | 2023125045 | 9/2023 |
| SA | 523450612 | 9/2023 |
| SA | 523450614 | 9/2023 |
| SA | 523450616 | 9/2023 |
| WO | WO 2013/173838 | 11/2013 |
| WO | PCT/US2022/019645 | 3/2022 |
| WO | PCT/US2022/019648 | 3/2022 |
| WO | WO 2022/192468 | 9/2022 |
| WO | WO 2022/192471 | 9/2022 |
| WO | WO 2022/192492 | 9/2022 |
| WO | PCT/US2022/019681 | 10/2022 |

OTHER PUBLICATIONS

Australian Application No. 2022232383, Second Examination Report dated Sep. 24, 2024.

European Application No. 22767943.8, Extended European Search Report dated Aug. 16, 2024.

Japanese Application No. 2023-554299, Non-Final Notification of Reasons for Refusal dated Sep. 10, 2024.

Japanese Application No. 2023-553638, Non-Final Notification of Reasons for Refusal dated Oct. 1, 2024.

Canadian Application No. 3,212,972, Examiner's Report dated Dec. 5, 2024.

Japanese Application No. 2023-554299, Decision of Refusal dated Dec. 12, 2024.

UAE Application No. P6002241/2023, Examination Report and Search Report dated Dec. 13, 2024.

UAE Application No. P6002244/2023, Examination Report and Search Report dated Dec. 13, 2024.

UAE Application No. P6002248/2023, Examination Report and Search Report dated Dec. 13, 2024.

U.S. Appl. No. 18/281,278, Gregory Peng, State Based Action Buttons, filed Sep. 8, 2023.

U.S. Appl. No. 18/281,279, Gregory Peng, Virtual Button Charging, filed Sep. 8, 2023.

PCT Application No. PCT/US2022/019681, International Preliminary Report on Patentability dated Sep. 12, 2023.

PCT Application No. PCT/US2022/019645, International Search Report and Written Opinion dated Jun. 16, 2022.

PCT Application No. PCT/US2022/019645, International Preliminary Report on Patentability dated Sep. 12, 2023.

PCT Application No. PCT/US2022/019648, International Search Report and Written Opinion dated Jun. 16, 2022.

PCT Application No. PCT/US2022/019648, International Preliminary Report on Patentability dated Sep. 12, 2023.

Australian Application No. 2022234308, First Examination Report dated Jan. 11, 2024.

Australian Application No. 2022234961, First Examination Report dated Jan. 12, 2024.

Australian Application No. 2022232383, First Examination Report dated Jan. 13, 2024.

International Patent Application No. PCT/US2022/019681, International Search Report and Written Opinion mailed Jun. 21, 2022, 10 pages.

Canadian Application No. 3,212,868, Examiner's Report dated Nov. 12, 2024.

Canadian Application No. 3,212,970, Examiner's Report dated Nov. 14, 2024.

(56)     References Cited

OTHER PUBLICATIONS

Japanese Application No. 2023-553639, Non-Final Notification of Reasons for Refusal dated Oct. 8, 2024.
Japanese Application No. JP2023-554299, Office Action, Mailed on Dec. 17, 2024, 9 pages.
New Zealand Application No. NZ803788, "First Examination Report", Mailed on Mar. 28, 2025, 4 pages.
European Application No. 22767958.6, Extended European Search Report dated Jul. 9, 2024.
European Application No. 22767945.3, Extended European Search Report dated Jul. 25, 2024.

* cited by examiner

300

DISPLAY DEVICE
308

CLIENT
DEVICE 306

SERVER
304

NETWORK
310

CONTROLLER 302

PROCESSOR 314

MEMORY 316

DYNAMIC CONTROL MODULE 324

CONFIGURATION MANAGEMENT
MODULE 326

CONFIG.
DATA 328

COMM. INTERFACE 312

HARDWARE 318

OUTPUT DEVICES 320

INPUT DEVICES 322

400
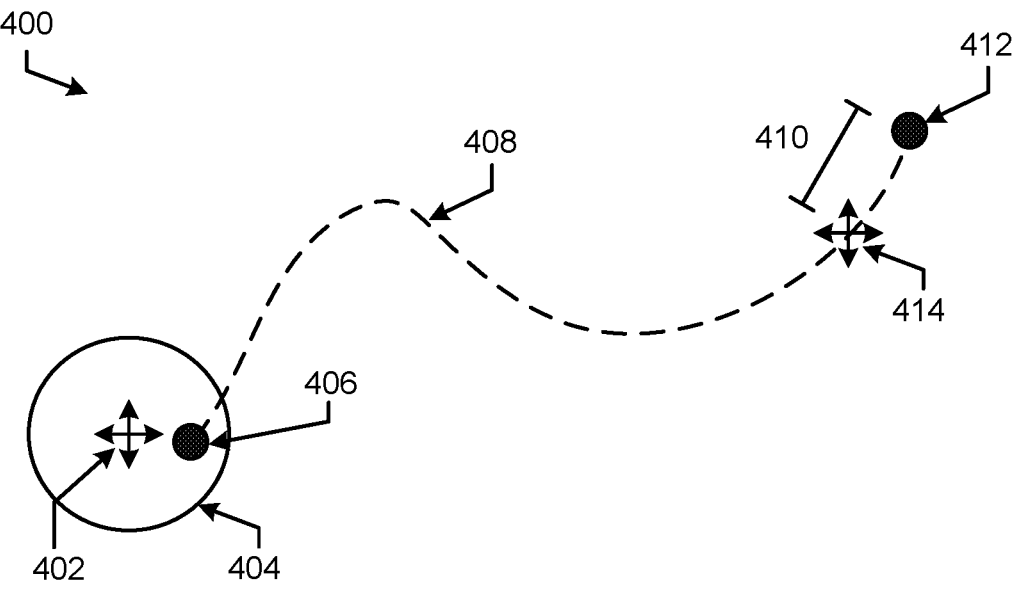
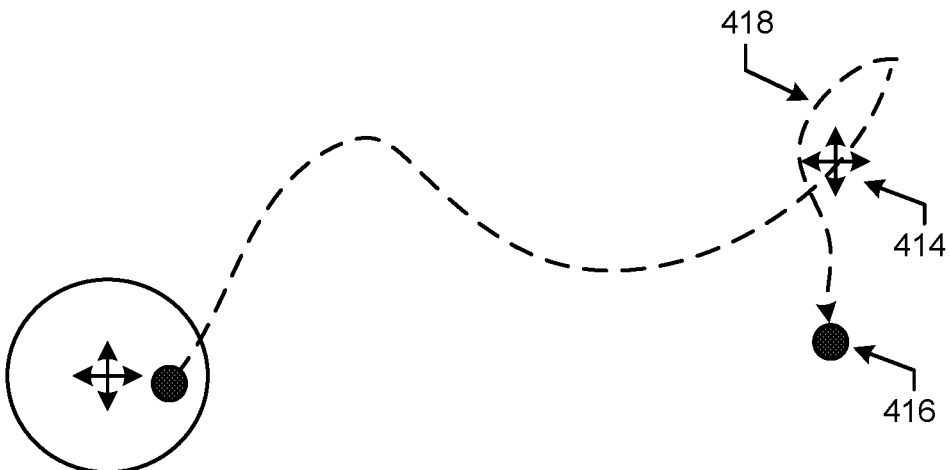
FIG. 4

600

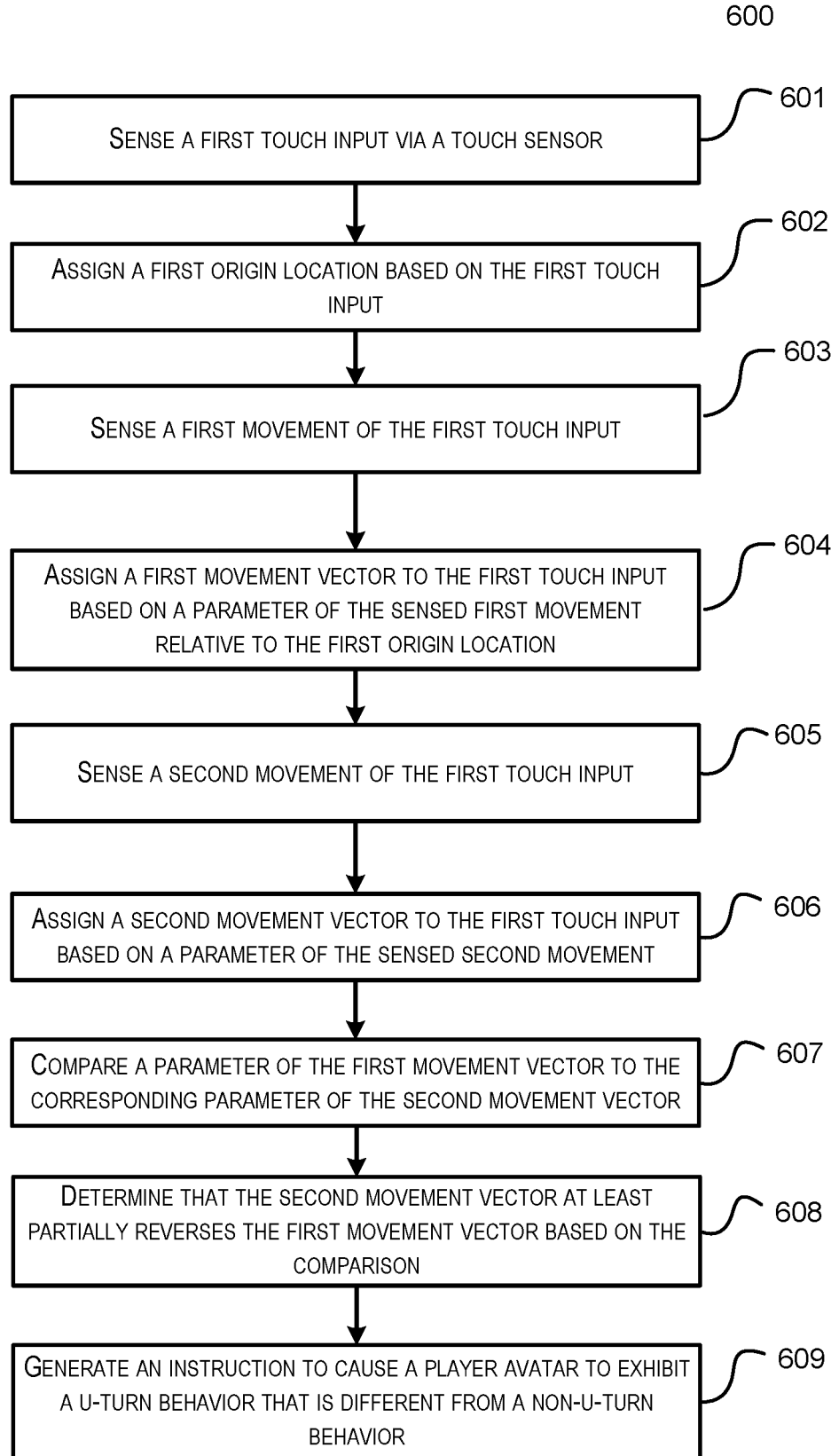

SENSE A FIRST TOUCH INPUT VIA A TOUCH SENSOR — 601

ASSIGN A FIRST ORIGIN LOCATION BASED ON THE FIRST TOUCH INPUT — 602

SENSE A FIRST MOVEMENT OF THE FIRST TOUCH INPUT — 603

ASSIGN A FIRST MOVEMENT VECTOR TO THE FIRST TOUCH INPUT BASED ON A PARAMETER OF THE SENSED FIRST MOVEMENT RELATIVE TO THE FIRST ORIGIN LOCATION — 604

SENSE A SECOND MOVEMENT OF THE FIRST TOUCH INPUT — 605

ASSIGN A SECOND MOVEMENT VECTOR TO THE FIRST TOUCH INPUT BASED ON A PARAMETER OF THE SENSED SECOND MOVEMENT — 606

COMPARE A PARAMETER OF THE FIRST MOVEMENT VECTOR TO THE CORRESPONDING PARAMETER OF THE SECOND MOVEMENT VECTOR — 607

DETERMINE THAT THE SECOND MOVEMENT VECTOR AT LEAST PARTIALLY REVERSES THE FIRST MOVEMENT VECTOR BASED ON THE COMPARISON — 608

GENERATE AN INSTRUCTION TO CAUSE A PLAYER AVATAR TO EXHIBIT A U-TURN BEHAVIOR THAT IS DIFFERENT FROM A NON-U-TURN BEHAVIOR — 609

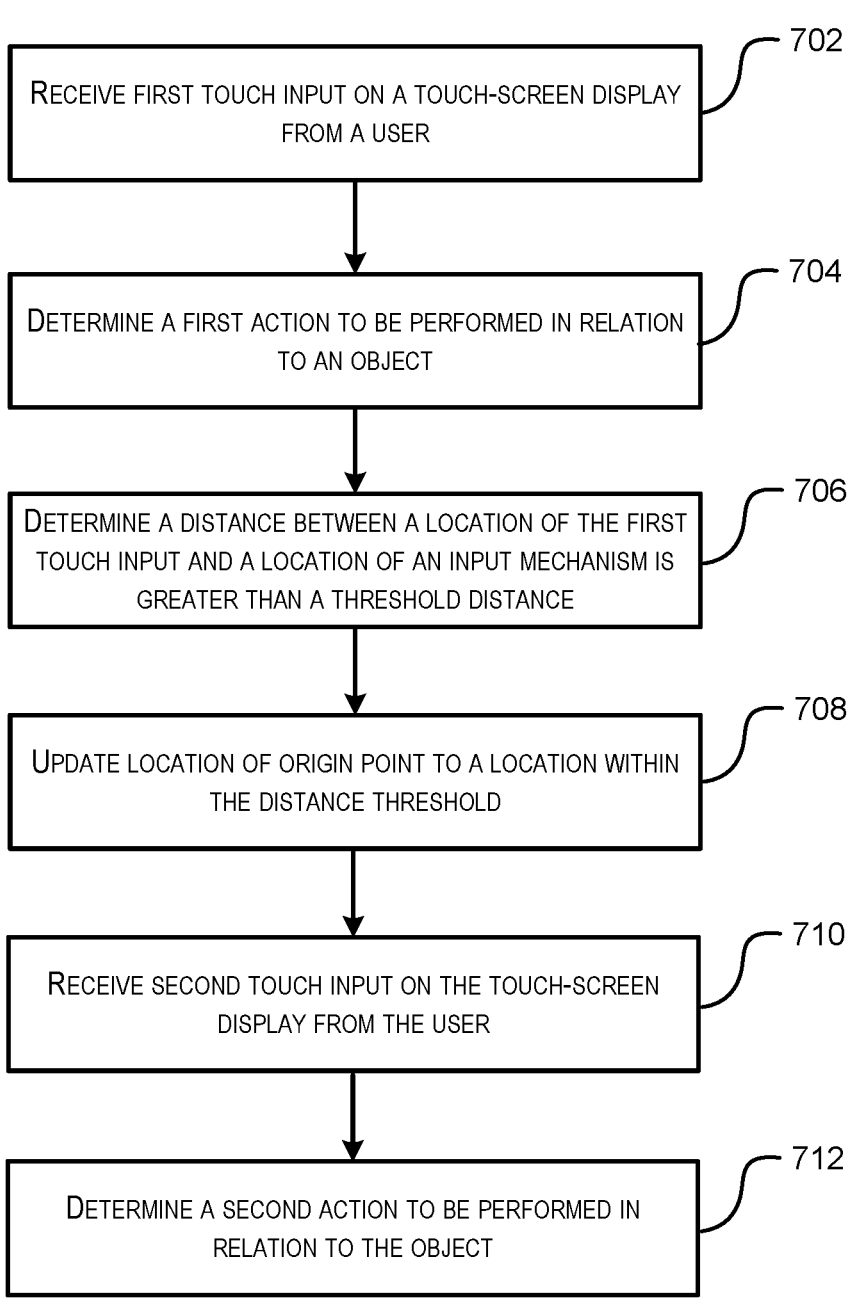

RECEIVE FIRST TOUCH INPUT ON A TOUCH-SCREEN DISPLAY FROM A USER — 702

DETERMINE A FIRST ACTION TO BE PERFORMED IN RELATION TO AN OBJECT — 704

DETERMINE A DISTANCE BETWEEN A LOCATION OF THE FIRST TOUCH INPUT AND A LOCATION OF AN INPUT MECHANISM IS GREATER THAN A THRESHOLD DISTANCE — 706

UPDATE LOCATION OF ORIGIN POINT TO A LOCATION WITHIN THE DISTANCE THRESHOLD — 708

RECEIVE SECOND TOUCH INPUT ON THE TOUCH-SCREEN DISPLAY FROM THE USER — 710

DETERMINE A SECOND ACTION TO BE PERFORMED IN RELATION TO THE OBJECT — 712

INFINITE DRAG AND SWIPE U TURN

BACKGROUND

Modern computer controller systems, such as those used by computer and video games, as well as by general-use operating systems, employ a variety of techniques to direct the movement of objects displayed on-screen. Known techniques include the use of an external control device such as a mouse, directional nub, touchpad, pen, game controller, or joystick to create either a directional vector or to designate a position for moving an onscreen object, such as a pointer or reticule, or to cause movement of a user's viewpoint.

Some techniques can employ an additional layer of sophistication by measuring the speed of movement of the external device to enhance movement of the on-screen object by changing the behavior of the on-screen object in response to a parameter of the input (e.g., acceleration of a pointer based on the speed at which an external device is moved). Touch-enabled devices can also be configured to accept inputs in ways that simulate the behavior of external control devices. However, control schemes for touch-enabled devices tend to fall short of the tactile feel and responsiveness that have been achieved in physical controllers, and further development in this field is warranted

SUMMARY

Techniques are provided herein for providing a virtual controller with a more intuitive control interface. Particularly, in virtual controllers that are used to control an object (such as a character or avatar) within a software application (such as a video game), the techniques may be implemented to improve a user's ability to control a movement of that object, such as via the use of a directional pad.

A virtual controller, as opposed to a physical controller, may be any suitable electronic device on which at least some of the control input mechanisms are instantiated virtually. For example, a virtual controller may include a touch-screen display that is configured to present a button or other input mechanism. A user's touch on the touch-screen display may be detected during the use of the virtual controller. If a location of the detected user's touch corresponds to a location of the presented button, then the button may be activated.

In one embodiment, a method is disclosed as being performed by a user device, the method comprising receiving, on a touch-screen display, an indication of a first touch input received from a user at a first location, determining, based at least in part on a distance between the first location and a second location associated with an origin point for an input mechanism being less than a threshold distance value, that a persistent directional input has been initiated, maintaining the persistent directional input as long as touch input is continuously detected, and while the persistent directional input is maintained: monitoring a touch input vector associated with the persistent directional input, upon detecting an angular change in the touch input vector that is greater than a threshold change value, determining that a reversal input has been provided, and causing the avatar to perform a reversal action corresponding to the reversal input.

An embodiment is directed to a computing system comprising a touch-screen display, a processor; and a memory including instructions that, when executed with the processor, cause the computing device to, at least receive, on the touch-screen display, an indication of a first touch input received from a user at a first location, determine, based at least in part on a distance between the first location and a second location associated with an origin point for an input mechanism being less than a threshold distance value, that a persistent directional input has been initiated, maintain the persistent directional input as long as touch input is continuously detected, and while the persistent directional input is maintained: monitor a touch input vector associated with the persistent directional input, upon detecting an angular change in the touch input vector that is greater than a threshold change value, determine that a reversal input has been provided, and cause the avatar to perform a reversal action corresponding to the reversal input.

An embodiment is directed to a non-transitory computer-readable media collectively storing computer-executable instructions that upon execution cause one or more computing devices to collectively perform acts comprising receiving, on a touch-screen display, an indication of a first touch input received from a user at a first location, determining, based at least in part on a distance between the first location and a second location associated with an origin point for an input mechanism being less than a threshold distance value, that a persistent directional input has been initiated, maintaining the persistent directional input as long as touch input is continuously detected, and while the persistent directional input is maintained: monitoring a touch input vector associated with the persistent directional input, upon detecting an angular change in the touch input vector that is greater than a threshold change value, determining that a reversal input has been provided, and causing the avatar to perform a reversal action corresponding to the reversal input.

The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different FIGS. indicates similar or identical items or features.

FIG. 4 depicts a graphical illustration of a process for implementing dynamic positioning of an origin point for a directional pad in accordance with embodiments;

FIG. 6 depicts an example process flow for performing actions based on dynamic directional controls in accordance with embodiments;

FIG. 7 depicts a flow diagram showing a first example process flow for generating and implementing dynamic directional controls on a virtualized physical controller in accordance with embodiments.

DETAILED DESCRIPTION

Figure 1:
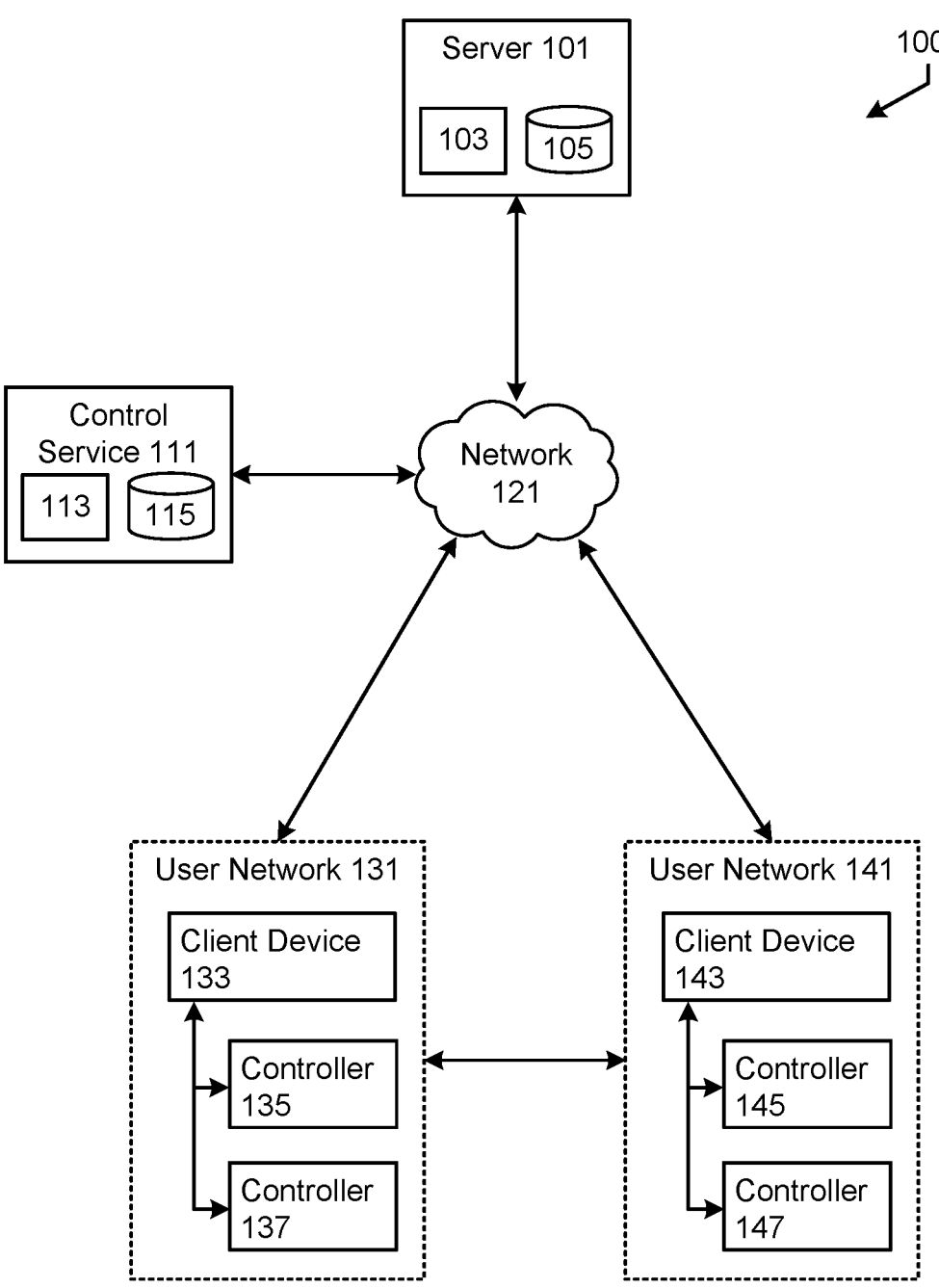
FIG. 1 is a simplified system diagram illustrating a service environment in which a virtual controller can be used, in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to techniques for implementing a virtual controller having a more intuitive control interface. Particularly, the techniques involve dynamically adjusting a position of an origin point for an input mechanism, such as a directional pad, based on movement by a user of the virtual controller. In such techniques, the movement by the user of the virtual controller may be a user's swipe or drag touch input, where the user drags his or her finger across the touch-screen display. In embodiments, a location of the origin point may be updated such that that origin point falls on the path of a user's swipe or drag touch input, but is located some threshold distance away from the latest location of the user's touch. As the user's touch input moves outside of that threshold distance, the origin point is updated to be the threshold distance away from the location of the user's touch input.

Embodiments of the disclosure provide for a number of advantages over conventional systems. In some controller systems implemented on a touch-screen device, avatar facing and movement speed can be controlled by a "directional pad" implemented in a predetermined location of the screen (e.g., on the left side). When, for example, a user's left thumb is initially placed on the directional pad, the controller recognizes that initial placement as "the origin" (similar to the center of an analog clock) for facing and movement. As the user slides his or her thumb in a direction away from the origin point, a vector is computed from the origin to the user's thumb location. A facing of the avatar (direction from the center) is updated based on a direction of the vector, and the speed the avatar is moving (length of the vector, or how far they have slid their thumb during the touch input).

Consider a scenario in which a player who is moving their character straight ahead (has their thumb extended towards a 12 o'clock position), and wants to quickly turn around (moves their thumb towards a 6 o'clock position), there will be several samples of input over many milliseconds where it looks like the player is still moving in the same direction (still pointing towards the 12 o'clock position), but the speed is just reduced (i.e., the length of the vector is smaller).

Finally, after many milliseconds, the player's thumb will be pointing towards the six o'clock position, and the game can update the orientation of the avatar.

Problems with conventional controllers may be three fold. First, the virtual controller may need to detect when the user wants to "turn around" his or her avatar earlier (e.g., after receiving fewer input samples). Second, when the user wants to turn his or her avatar around, the virtual controller will want to minimize how far the user's thumb has to travel to cause the user to move in the opposite direction. Third, the virtual controller should solve both of the above with a "floating" virtual controller that isn't anchored in position, in order to allow players to change their thumb position more comfortably as they play.

In the embodiments described herein, the system not only looks at the state of the virtual controller input (e.g., "user is pointing their thumb towards the 12 o'clock position on the controller"), but also at the change from the user's last thumb position to the user's current thumb position, and builds a "swipe vector" (giving both direction and length of the swipe), from which the system can deduce player intent (in this case, detecting the user wants to rapidly turn around).

In embodiments, when the system detects a change in direction for the user's touch input (e.g., a "u-turn swipe"), the origin point for the directional pad is repositioned, either a predetermined distance from, or under, the current location of the user's thumb (e.g., the center of the controller now being the old center+swipe direction), instantaneously resulting in future received touch input from the user being compared against the new origin point. Such techniques provide an important innovation that results in a "floating" directional pad that is more responsive than a fixed location (or anchored) directional pad as a user's thumb need not travel as far to enact quick directional changes.

In some embodiments, directional controls implemented on a virtual controller enable the manipulation of a button state on the other hand (e.g., a separate button-press indicating a character action, such as the character wants to sprint or attack) to modify the behavior of the character when a detection is made that the player wants to rapidly change an orientation of his or her character. For example, if the character is sprinting, that character can animate to a "screeching stop slide" before turning vs just snapping 180 degrees if they are walking and not pressing the sprint button.

In some embodiments, a directional change (e.g., of a "u-turn swipe") can be emphasized by triggering non-visual feedback to the user, e.g., haptic feedback and/or audible feedback when the input has been successfully processed to indicate the directional change. For example, a successful "u-turn swipe" can result in haptic feedback that coincides with, follows, or that precedes visible change in the movement of the user's avatar on screen, or in audible feedback (such as a chime) that coincides with, follows, or precedes the same visible change in the movement of the user's avatar on screen. Audible and/or haptic feedback can occur in any suitable sequence, can occur simultaneously, or one form of feedback can be used.

FIG. 1 is a simplified system diagram illustrating a service environment 100 in which a virtual controller can be used, in accordance with various embodiments of the present disclosure. The service environment 100 includes at least one server 101, which includes at least one processor 103 and non-transitory memory 105 storing as software instructions to facilitate operation of the service environment. The server 101 is connected via a network 121 (e.g., the Internet or a local network), with any suitable number of user-owned client devices 133, 143, which typically operate in conjunction with respective local user networks 131, 141 (e.g., consumer or commercial local area networks, WIFI networks, etc.)

The server 101 can also connect to any suitable number of control services 111, e.g., network-connected computing systems with their own processors 113 and memory 115 that monitor network to and from the server 101 and client devices 133, 143. In some embodiments, the server 101 can be one or more servers operating at commercial scale, e.g., a datacenter or server farm. Client devices 133, 143 can include, but are not limited to, consumer personal computers, video game consoles, thin-client devices operable to stream video content from the server 101 for presentation on a local screen, or mobile devices such as smartphones, tablets, or the like. Client devices 133, 143 can connect to any suitable number of controllers, e.g., controller 135, 137, 145, 147.

Each controller (e.g., controller 135) can be hardware devices (e.g., console-specific controllers, cross-compatible controllers, or virtual controllers) with connectivity hardware and protocols for communicating with their respective client device 133. According to some embodiments, controller 135 can be a virtualized controller operating on a thin-client device or touch-screen device, e.g., a controller simulated on a touchscreen smartphone, tablet, or console-like controller with a touch-enabled panel. According to some further embodiments, e.g., where the client device 133 is a thin-client device or mobile device, controller 135 can be a touchscreen with virtualized controls that is built-in to the client device. Alternatively, even where the client device 133 is a thin-client device, controller 135 can be a hardware controller configured to physically or wirelessly connect with the client device. According to some embodiments, the client device 133 and server 101 can operate on the same hardware, e.g., the client device running as a virtual instance on the server.

The methods described herein can be implemented on client devices in conjunction with a service environment such as service environment 100 described in FIG. 1. The methods can further work in the context of arbitrary placement of the virtual controller, which controls both avatar facing and movement, on-screen.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
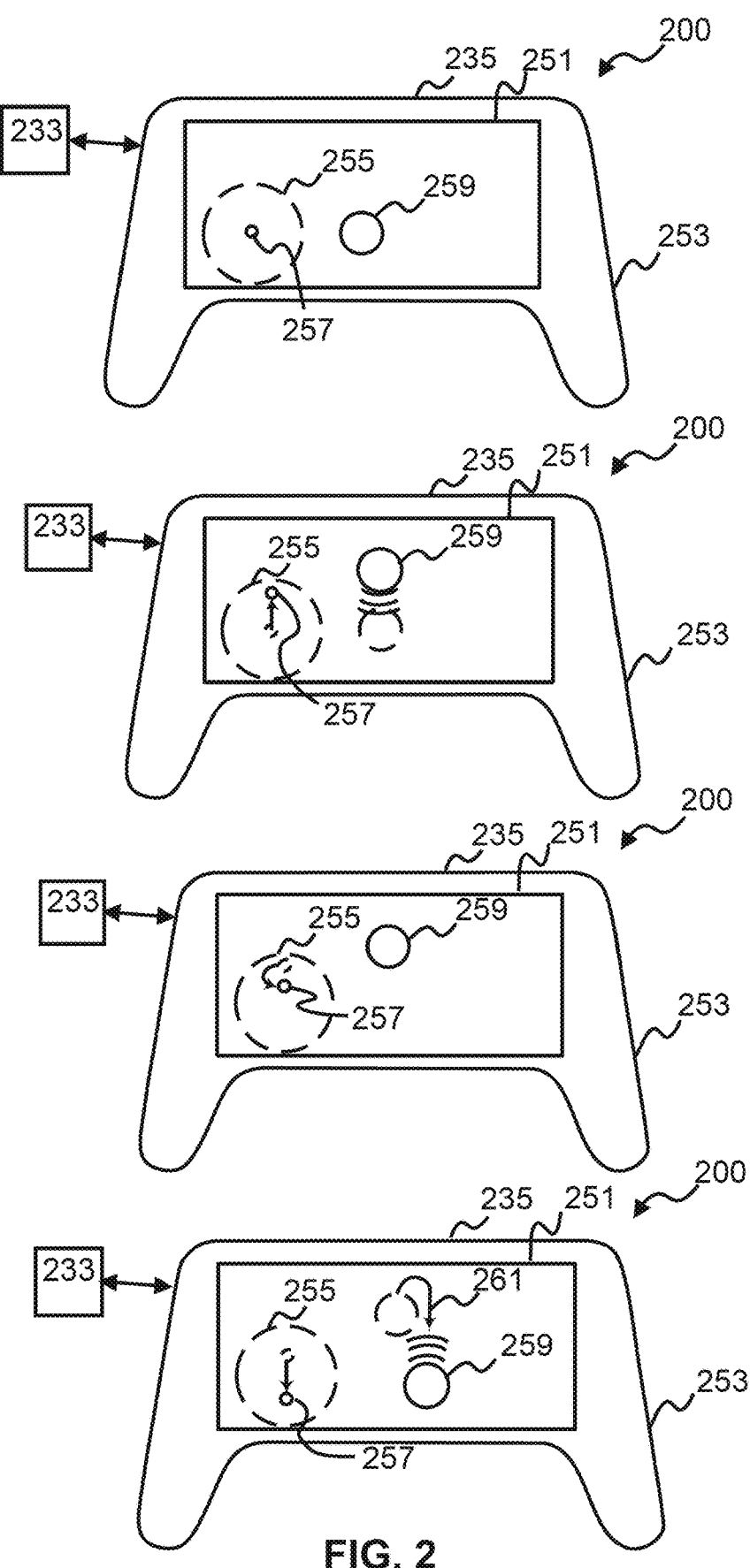
FIG. 2 depicts an illustrative example of an environment that includes a virtual controller in which controls for providing infinite drag and swipe may be implemented in accordance with embodiments.

FIG. 2 depicts an illustrative example of an environment 200 that includes a virtual controller in which controls for providing infinite drag and swipe may be implemented in accordance with embodiments.

FIGS. 2A-2D illustrate an example of a swipe-controlled "u-turn" process in a control scheme 200 employing a virtual controller 235 in communication with a video game system 233, in accordance with various embodiments. The virtual controller 235 includes a touchscreen 251 which can receive player inputs 257. The player inputs 257 are received in the form of a touch, typically originating within a zone 255 that corresponds to movement controls, though the size and location of the zone can vary, or the zone can be the entire screen. The virtual controller 235 can be a dedicated touchscreen device configured to virtualize an assortment of controller schemes in software via touchscreen 251, or can be a mobile device such as a smartphone or the like that can present a virtual touchscreen. In some embodiments, the virtual controller 235 can include ergonomic features such as handles 253, or can even include hardware controls (buttons, joysticks, and the like) in addition to touchscreen controls.

FIG. 2A illustrates the initial state of a virtual controller, according to at least one embodiment of the present disclosure. In FIG. 2A, the player input 257 is initiated with a touch to the touchscreen 251 that sets an origin location. An in-game object, such as an avatar 259, which may be displayed on the same touchscreen 251 or on a different screen, remains stationary as no movement has yet been detected.

FIG. 2B illustrates a second state of the virtual controller of FIG. 1A, in which a user has moved the input location in a first direction relative to the first origin. In FIG. 2B, the player input 257 moves along the touchscreen 251, causing a first movement vector to be assigned. At this point, movement of the avatar 259 can be generated by the video game system. The direction and magnitude of the player input 257, or "swipe," can be registered to memory and used to generate a first movement vector having directionality and magnitude.

FIG. 2C illustrates a third state of the virtual controller of FIG. 1A, in which the user has reversed movement of the input location relative to the first direction. The first player input can be interrupted, e.g., by a change in direction or by a break in contact between the player and the touchscreen. For example, as shown in FIG. 2C, a "lift" can occur whereby the player momentarily ceases touching the touchscreen 251 and resumes at a different location, the new player input 257 then being assigned as a new origin location.

FIG. 2D illustrates a fourth state of the virtual controller of FIG. 1A, in which the user has repositioned the input location without creating a movement vector. FIG. 2D shows the player input 257 being moved in an opposite direction from the original direction of movement, which generates a second movement vector that is roughly opposite the first movement vector in direction, though not necessarily in magnitude. Responsive to the second movement vector being a reversal of the first movement vector, the system can infer player intent to perform a "u-turn," which can be conducted in a manner different from merely reversing movement direction, e.g., enabling a specified "u-turn" animation 261 as well as predefined "u-turn" behavior that differs from the behavior concomitant with normal movement. For example, engaging a "u-turn" can disable types of game behavior, such as falling off ledges; can enable types of game behavior, such as making available predetermined movements or attacks not accessible during normal movement; or can reverse direction with a different acceleration profile than that applied during normal movement.

Figure 3:
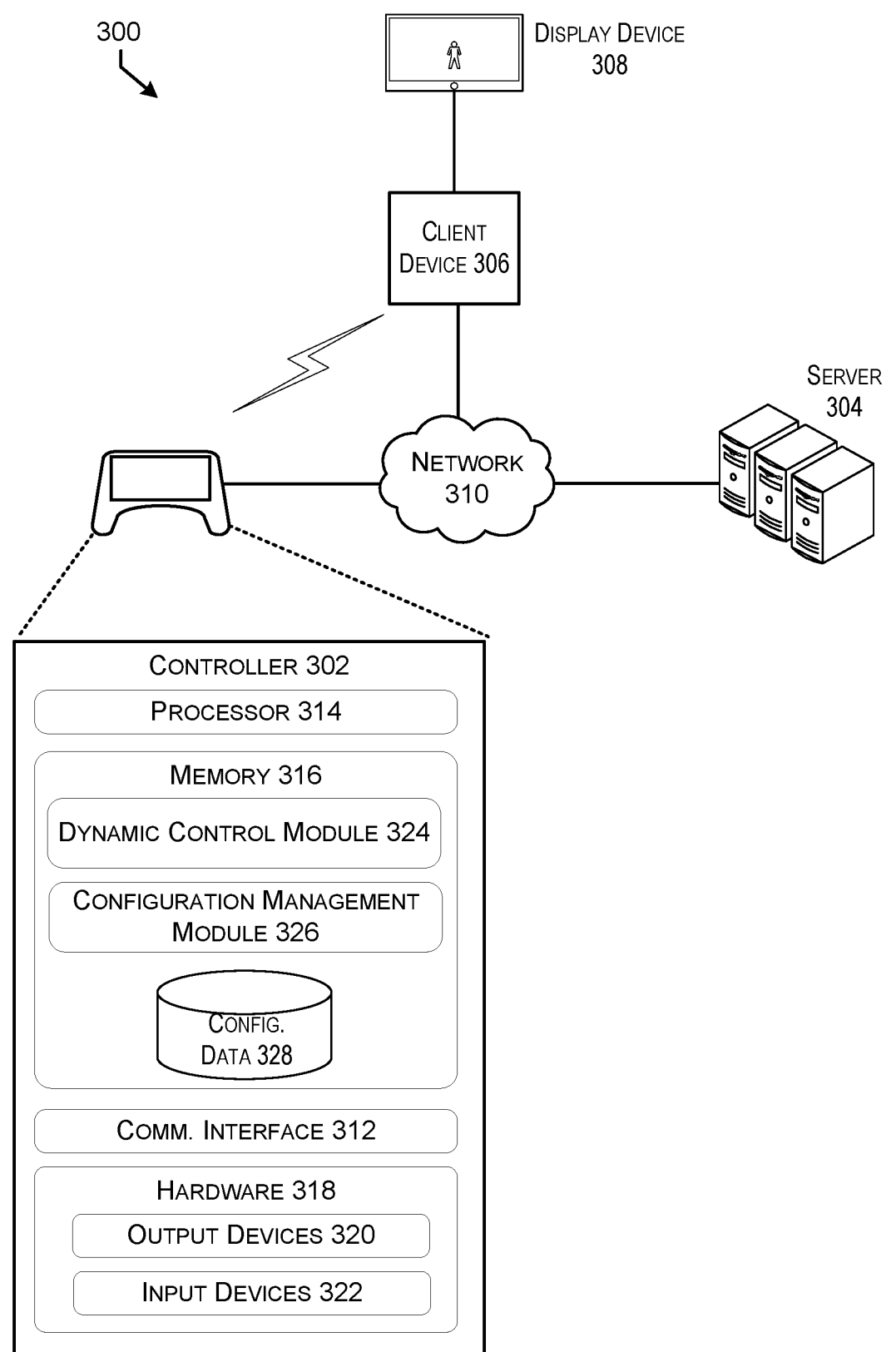
FIG. 3 is a block diagram showing various components of a computing system architecture that supports implementation of a virtualized physical controller in accordance with embodiments.

FIG. 3 is a block diagram showing various components of a computing system architecture that supports implementation of a virtualized physical controller in accordance with embodiments. The system architecture may include at least one controller 302. In some embodiments, the controller 302 may be in communication with one or more server 304, which may be an example of the server 101 as described with respect to FIG. 1. In some embodiments, the one or more server 101 may provide backend support for the controller 302. For example, at least a portion of the processing described as being performed by the controller 302 may instead be performed by the server 101 in some cases. In some embodiments, the controller 302 may be in communication with a client device 306. The client device 306 may be an example of client device 133 or 143 as described in relation to FIG. 1 above. In some embodiments, the client device 306 may be in further communication with a display device 308. Each of the components described herein may be in communication via a connection over a network 310.

The controller 302 may include any suitable computing device configured to perform at least a portion of the operations described herein and configured to enable a user to interact with a software application. In some embodiments, the controller may be a mobile device (e.g., a smartphone or tablet) having touchscreen capabilities. The controller 302 may include a communication interface 312, one or more processors 314, memory 316, and hardware 318. The communication interface 312 may include wireless and/or wired communication components that enable the controller 302 to transmit data to and receive data from other networked devices. The hardware 318 may include additional user interface, data communication, or data storage hardware. For example, the user interfaces may include at least one output device 320 (e.g., visual display, audio speakers, and/or haptic feedback device), and one or more data input devices 322. The data input devices 322 may include, but are not limited to, combinations of one or more of keypads, keyboards, mouse devices, touch-screens that accept gestures, microphones, voice or speech recognition devices, and any other suitable devices.

The memory 316 may be implemented using computer-readable media, such as computer storage media. Computer-readable media includes, at least, two types of computer-readable media, namely computer storage media and communications media. Computer storage media includes any suitable volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 314 and the memory 316 of the controller may implement functionality that includes one or more software modules and data stores. Such software modules may include routines, program instructions, objects, and/or data structures that are executed by the processors 314 to perform particular tasks or implement particular data types. More particularly, the memory 316 may include a module that is configured to implement a dynamic control pad on a virtual controller (e.g., dynamic control module 324) as well as a module that is configured to maintain and implement configuration information for input mechanisms of a virtualized controller (e.g., configuration management module 326).

Additionally, the memory 316 may include various data stores. For example, the memory 316 may maintain data about virtualized controller configurations based on context (e.g., configuration data 328). In some embodiments, such configuration data may include an indication of one or more aspects of the input mechanisms that should be implemented. For example, the configuration data may include an indication of a size, location, shape, appearance (e.g., color, shading, and/or text) of each input mechanism.

The dynamic control module 324 may be configured to, in conjunction with the processor 314, monitor for user touch input received via a touchscreen display. In some embodiments, the touch input may be used by the dynamic control module to update a location associated with an origin point for a directional pad. For example, as user touch input (e.g., a user drag or swipe operation) is received in relation to the directional pad via the touch-screen display and processed, a speed and/or direction of that touch input may be used to generate movement instructions for an object (e.g., a character) being controlled via the virtual controller. In this example, a trail or path of the user's touch input may be maintained. As the user's touch input is received, a current location associated with that touch input is compared to a current location of an origin point for the directional pad to determine whether a distance between the two locations is greater than a threshold distance value. Upon determining that the distance is greater than the threshold distance value, the current location of the origin point for the directional pad can be updated to be a location that is the threshold distance from the current location of the user touch along the path associated with the user's touch input. In some embodiments, the threshold distance may be updated in order to adjust a sensitivity of the directional controls for the virtual controller.

As the origin point for the directional pad is updated, the user's touch input may be processed in relation to that new origin point location. For example, as the user's touch input continues to be received, a vector may be determined based on the relative location and speed of the user's touch input with respect to the new origin point location. An object being controlled via the directional pad may then be moved according to that vector. In some embodiments, once the touch input from the user is no longer detected (e.g., the user has stopped touching the touch-screen display), the origin point for the directional pad may reset to its initial location. In some embodiments, this may occur after a predetermined amount of time has elapsed since the user's touch input was last detected.

The configuration management module 326 may be configured to, in conjunction with the processor 314, generate and manage configuration information in relation to an arrangement of one or more input mechanisms within a user interface presented on the controller 302. In some embodiments, the configuration management module facilitates customization of input mechanism layout in accordance with some embodiments. It should be noted that such customization is described in related Patent Cooperation Treaty (PCT) Application Number US2022/019240, entitled "Virtualized Physical Controller," by Gregory Peng, which is herein incorporated by reference in its entirety.

The server 304 can include any computing device configured to perform at least a portion of the operations attributed to it. The server 304 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 304 can include one or more virtual machines running virtual operating systems, or other computing architectures involving virtualization such as one or more flexible pools of logical storage devices that can be virtualized to maintain virtual storage devices for the computer. For example, the server 304 may include virtual computing devices in the form of virtual machines or software containers that are hosted in a cloud.

The client device 306 may include any suitable computing device configured to receive input from the controller 302 and perform an action based on that input. In some embodiments, the client device may be a gaming system, such as a gaming console that may receive input from a number of controllers, each of which may be used to control an avatar or character within a software application (e.g., a computer game).

FIG. 4 depicts a graphical illustration of a process for implementing dynamic positioning of an origin point for a directional pad in accordance with embodiments. The process 400 may be performed on a user device upon which a virtual physical controller has been implemented, such as the controller 302 as described with respect to FIG. 3 above.

In the process 400, an input mechanism, such as a directional pad, may be associated with an origin point 402. At an initial state, the origin point may be located at a predetermined location For example, the origin point for a particular input mechanism may initially be positioned at a location on the touch-screen display that is indicated in a configuration data for the virtual controller and/or the software application being executed. In addition to the origin point 402, the input mechanism may be associated with a region or area 404 that defines the input mechanism on the touch-screen display. In some embodiments, the area 404 may include a predetermined area based on information included in the configuration data. In some embodiments, the area 404 may include a region of space that is bounded by a predetermined amount of distance from the origin point 402. In some embodiments, an outline or other indicator may be displayed on the touch-screen display to identify the area 404.

In the process 400, touch input may be detected from a user. Upon determining that the touch input has originated at a location 406 within the area 404 associated with the directional pad, the touch input may be determined to be associated with an action associated with that directional pad. In some cases, the user may then create continuous touch input (e.g., a drag or swipe operation) by dragging his or her finger across the touch-screen display. In some embodiments, even if the touch input leaves the area 404, the resulting drag operation may continue to be associated with the directional pad until the touch input is ceased (e.g., the user stops touching the touch-screen display. As long as the drag operation is detected, movement instructions are generated for an object controlled by the directional pad based on a relationship between the drag operation and an origin point for the directional pad.

During a detected drag or swipe touch input, the received touch input may be monitored to record a path 408 followed by the user during the drag operation. In some embodiments, the touch input may be associated with the drag operation for as long as the user maintains touch contact with the touch-screen display. In some cases, the drag operation may be determined to have ceased upon detecting that the user is no longer touching the touch-screen display. In some cases, the drag operation is determined to be ceased upon detecting that the user has not touched the touch-screen display for more than a predetermined amount of time. In some embodiments, once the drag operation is determined to have been ceased, a location of the origin point may be reset to its initial location 402.

In some cases, a current location of the touch input may be compared to a current location of the origin point for the directional pad as new touch input is received. If a determination is made that the distance between the two locations is greater than a threshold distance 410, then a location of the origin point may be updated to be a distance equal to the threshold distance from the current location. In some embodiments, the origin point may be updated to be at a location that falls upon the path 408 of the drag operation. In this manner, the location of the origin point may constantly be updated based on received user touch input. In some embodiments, the origin point may be updated to be at a location that is not necessarily on the path 408, but instead falls directly behind the current touch input. In other words, the location of the origin point may be set to a point that is a threshold distance in the opposite direction of a current direction in which the user touch input is determined to be moving.

By way of illustration, when a user drags his or her finger along the path 408 to a location 412, the location of the origin point may be updated to the location 414, such that the distance between the location 412 and the location 414 is equal to the threshold distance. It should be noted that an amount associated with the threshold distance may be adjusted in order to increase or decrease a sensitivity of the input mechanisms of the virtual controller.

Once the location of the origin point has been updated, new touch input may be received in relation to the drag operation. Upon receiving such touch input, it may be processed in relation to the current location of the touch input. For example, if the user changes direction or speed in the drag operation, such a change may be translated into movement for a controlled object based on the relationship between the new direction or speed and the updated origin point location.

By way of illustration, continuing from the example above, once the location of the origin point has been updated to a location 414, the user may continue with the drag operation to a second location 416 along a second portion 418 of the path. At that time, the input received along the second portion 418 may be used to generate movement instructions for the object being controlled in relation to the updated origin point. In some cases, while the second portion 418 of the path falls within the threshold distance from the location 414, the location of the origin point may not be updated.

Figure 5:
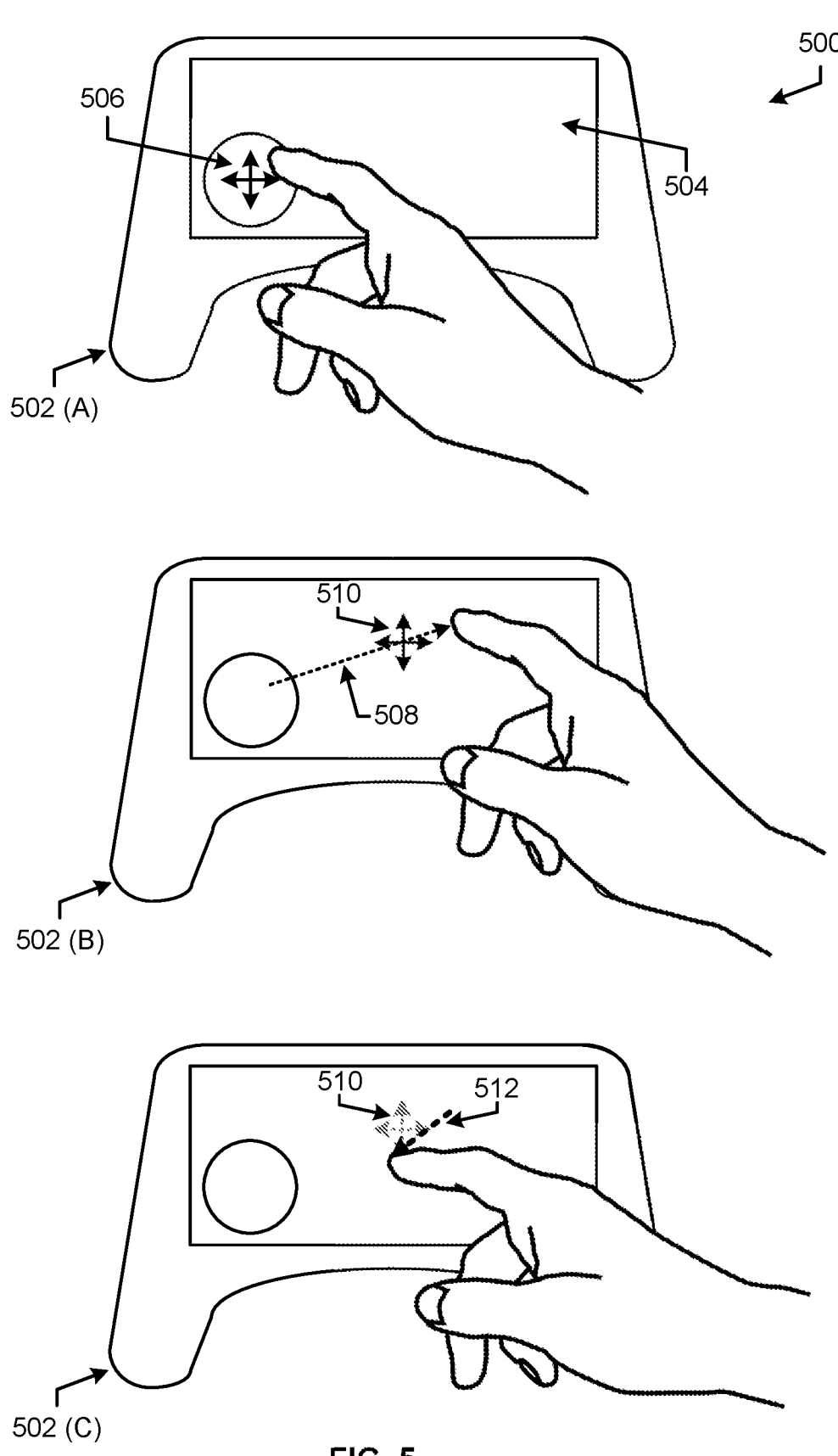
FIG. 5 depicts a graphical illustration of a process for executing a charge operation on a virtual controller in accordance with embodiments.

FIG. 5 depicts a graphical illustration of a process for executing a charge operation on a virtual controller in accordance with embodiments. The process 500 is depicted on a series of images of a user device 502 (A-C) on which a virtual controller may be implemented. As depicted, the virtual controller may be implemented via a graphical user interface (GUI) 504 that is presented on a touch-screen display.

As depicted at 502 (A), a user may provide touch input to the touch-screen of the user device. A determination may be made that the detected touch input corresponds to particular input mechanism based on a location of that touch input being within an area assigned to the input mechanism. In some embodiments, the detected touch input is determined to correspond to the input mechanism if it originates in the area assigned to the input mechanism. In some embodiments, the detected touch input is determined to correspond to the input mechanism if it at least passes through the area assigned to the input mechanism.

Upon making a determination that the touch input corresponds to an input mechanism, such as a directional pad 506, the user device may initiate an action that corresponds to that input mechanism. In some cases, one or more aspects of the action may depend on the type and/or location of the detected touch input. For example, if the input mechanism is a directional pad that controls the movement of an object in a game, the movement of the object may depend on a location of the touch input with respect to an origin point (e.g., center) of the directional pad as well as a distance of the touch input from the origin point and/or a speed and direction of travel for the touch input. In some embodiments, information may continue to be generated to move the controlled object as long as the touch input continues to be received.

As depicted at 502 (B), the user may continue providing the touch input and may perform a drag or swipe operation 508 by dragging his or her finger across the touch-screen display. In some cases, the drag operation 508 may end at, or at least pass through, a location outside of an area associated with the input mechanism. In these embodiments as new touch input is received, a current location of the touch input may be compared to a current location of an origin point for the input mechanism. If a distance between the current location of the touch and the current location of the origin point is greater than a predetermined threshold distance value, then the current location of the origin point is updated to be a location 510 at the threshold distance away from the current location of the touch input. This is described in greater detail with respect to FIG. 4 above.

As depicted at 502 (C), after the current location of the origin point has been updated, the user may continue to perform the drag operation by dragging his or her finger to a different location on the touch-screen display. Upon detecting the continued drag operation 512, the touch input detected in relation to that continued drag operation is processed in relation to the directional pad as if it were located at the location 510. In this manner, the virtual controller is able to implement controls that are more intuitive to a user than implemented in conventional controllers. Additionally, such implementations can result in providing users of the virtual controller with an increased responsiveness (e.g., lowered response time) by reducing the amount of distance that a user has to drag or swipe to perform an action.

FIG. 6 depicts an example process flow 600 for performing actions based on dynamic directional controls in accordance with embodiments. Particularly, the process for implementing a "u-turn swipe" is described diagrammatically in FIG. 6. The process 600 can be performed on any suitable service environment, including but not limited to service environment 100 shown in FIG. 1.

In accordance with various embodiments, process 600 includes sensing a first touch input via a touch sensor of a gaming system at 601. The system can assign a first origin location based on the first touch input at 602, and then can sense a first movement of the first touch input based on a change in the input received by the touch sensor at 603. A first movement vector can be assigned to the first touch input based on a parameter of the sensed first movement relative to the first origin location at 604. As further inputs are received, the system can sense a second movement of the first touch input at 605. A second movement vector can be assigned to the first touch input based on a parameter of the sensed second movement at 606. When the first and second movements are detected within a limited period of time, even if interrupted by a lift and replace action by the user, the system can determine that a first u-turn input has been received by comparing the first movement vector to the second movement vector at 607 and detecting that the second movement vector at least a partially reverses the first movement vector at 608. In response to determining that the first u-turn input has been received, the system can generate an instruction to cause a player avatar to exhibit a u-turn turning behavior that is different from a non-u-turn turning behavior at 609.

FIG. 7 depicts a flow diagram showing a first example process flow 700 for generating and implementing dynamic directional controls on a virtualized physical controller in accordance with embodiments. The process 700 may be performed by a computing device that is configured to generate activation data based on user input. For example, the process 700 may be performed by a controller capable of facilitating interaction between the user and a software application, such as the controller 302 described with respect to FIG. 3 above. In some embodiments, such a software application is a video game played by the user.

At 702, the process 700 comprises receiving a first touch input on a touch-screen display from a user. In some embodiments, the first touch input is determined to be associated with a particular input mechanism by virtue of the first location being within an area associated with the input mechanism. In some embodiments, the input mechanism comprises a directional pad that is used to control a movement of the object.

At 704, the process 700 comprises determining a first action to be performed in relation to an object. In some cases, the object may be an avatar controlled by the user within a video game. In embodiments in which the input mechanism is a directional pad, the first action comprises moving the object based on a difference between the first location and the second location (e.g., a distance and/or relative position). In such cases, at least one of a direction or degree to which the object is moved may be dependent upon at least one of a difference between the first location and the second location or a speed associated with the first touch input. For example, a speed attributed to the movement of the object may be determined based on a speed at which the user performs the touch input.

At 706, the process 700 comprises determining that a distance between a location associated with the first touch input and a location associated with the input mechanism (e.g., an origin point) is greater than a threshold distance value. In the case that the distance between the location associated with the first touch input and the location associated with the input mechanism is less than or equal to the threshold distance value, no updates may be made to the input mechanism.

At 708, the process 700 comprises updating the location associated with the input mechanism to be within the threshold distance value of the location associated with the first touch input. In some embodiments, the threshold distance value is determined based on information provided by the software application. For example, information provided by a software application (e.g., a video game) controlled via the virtual controller may be used to determined what an appropriate distance threshold is for that video game. In some embodiments, the threshold distance value is determined based on one or more aspects of the object. For example, the distance threshold may be correlated to a speed at which the object is currently moving, such that the distance threshold may be increased when the object is moving faster. In some embodiments, the threshold distance value is determined based on user preferences. For example, a user may indicate a degree or level of sensitivity or responsiveness to be associated with the virtual controller. In this example, a lower distance threshold may result in a higher level of sensitivity and/or responsiveness. In some embodiments, the threshold distance value is determined based on a speed associated with the first touch input. For example, the threshold distance may be varied based on a speed associated with the user's touch input. In this example, if the user performs a drag operation at a high speed, a larger distance threshold may be used then if the user performs a drag operation at a low speed.

At 710, the process 700 comprises receiving a second touch input one the touch-screen display from the user. In some embodiments, the first touch input and the second touch input are part of a single drag operation performed by the user on the touch-screen display. In some cases, the third location lies on a path associated with the drag operation. In other cases, the third location may not necessarily lie along the path. For example, in some cases, the third location may be a location directly behind a facing of the object.

At 712, the process 700 comprises determining a second action to be performed in relation to the object. In embodiments in which the input mechanism is a directional pad, the second action comprises moving the object based on a difference between the fourth location and the third location. In such cases, at least one of a direction or degree to which the object is moved may be dependent upon at least one of a difference between the fourth location and the third location or a speed associated with the second touch input. For example, a speed attributed to the movement of the object may be determined based on a speed at which the user performs the touch input. In the case that the object is already moving, the second action to be performed in relation to the object may be a u-turn action.

Figure 8:
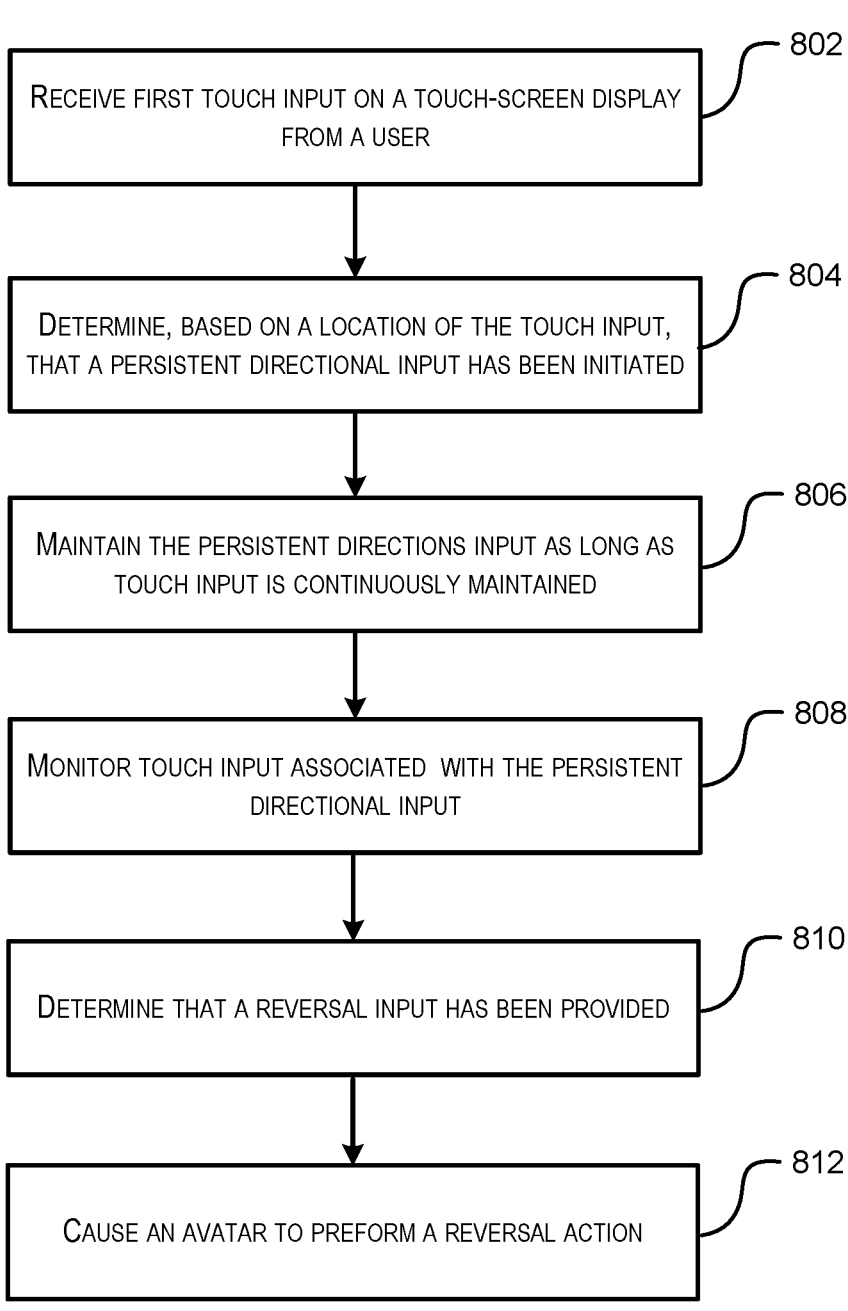
FIG. 8 depicts a flow diagram showing a second example process flow 800 for generating and implementing dynamic directional controls on a virtualized physical controller in accordance with embodiments.

FIG. 8 depicts a flow diagram showing a second example process flow 800 for generating and implementing dynamic directional controls on a virtualized physical controller in accordance with embodiments. The process 800 may be performed by a computing device that is configured to generate activation data based on user input. For example, the process 800 may be performed by a controller capable of facilitating interaction between the user and a software application, such as the controller 302 described with respect to FIG. 3 above. In some embodiments, such a software application is a video game played by the user.

At 802, the process 800 comprises receiving (e.g., on a touch-screen display) an indication of a first touch input received from a user at a first location. In some embodiments, the touch input is received in relation to the control of an avatar in a video game. In such embodiments, the avatar is a character object controlled by the user via the user device.

At 804, the process 800 comprises determining that a persistent directional input has been initiated. In some embodiments, such a determination may be made based at least in part on a distance between the first location and a second location associated with an origin point for an input mechanism being less than a threshold distance value. In some embodiments, the input mechanism comprises a directional pad that is used to control a movement of the avatar. In some cases, the threshold distance value is determined based on information provided by the software application. In some cases, the threshold distance value is determined based on information stored in configuration data with respect to a directional pad input mechanism. In some cases, the threshold distance value is determined based on user preferences. In some cases, the threshold distance value is determined based on a speed associated with the first touch input.

At 806, the process 800 comprises maintaining the persistent directional input as long as touch input is continuously detected. The following processes may be performed while the persistent directional input is maintained.

At 808, the process 800 comprises monitoring a touch input vector associated with the persistent directional input. In some embodiments, the touch input vector associated with the persistent directional input comprises a current direction in which the touch input is moving. In some embodiments, a touch input vector associated with the persistent directional input is generated based on touch input received over a preceding period of time.

At 810, the process 800 comprises upon detecting an angular change in the touch input vector that is greater than a threshold change value, determining that a reversal input has been provided. In some embodiments, the angular change in the touch input vector comprises a degree of rotational change over a predetermined period of time. For example, the degree of rotation over a predetermined period of time may be a rotation of greater than, or equal to, 150 degrees within the predetermined period of time (e.g., the last second).

At 812, the process 800 comprises causing the avatar to perform a reversal action corresponding to the reversal input. In some embodiments, a combination of the persistent directional input and the reversal input causes the avatar to perform a conventional movement action in combination with the reversal action. In at least some of these embodiments, at least one of a direction or degree to which the avatar is moved in the conventional movement action in combination with the reversal action is dependent upon the touch input vector. In some embodiments, the reversal action comprises a u-turn action to be performed in relation to the avatar.

The methods described herein are directed to virtual controllers, i.e., controllers that use a touchscreen or touch-screen-like functionality to provide for readily customized controller button layouts. According to some embodiments, the touchscreen is at least a portion of a physical, handheld controller that interfaces with a gaming device like a gaming console, personal computer, tablet, smartphone, thin client device (e.g., USB or HDMI device plugged in to a screen). According to some embodiments, the touchscreen is the predominant feature of the controller, which interfaces with a gaming device like a gaming console, personal computer, tablet, smartphone, thin client device (e.g., USB or HDMI device plugged in to a screen). According to some embodiments, the controller is made up of a mobile device or tablet in conjunction with enabling software that connects the mobile device or tablet to a gaming device like a gaming console, personal computer, thin client device (e.g., USB or HDMI device plugged in to a screen) or other suitable gaming device. According to some further embodiments, the touchscreen is a touch-enabled screen of a gaming device like a gaming console, personal computer, tablet, or smartphone.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as being essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Example A. A method comprising: receiving, on a touch-screen display, an indication of a first touch input received from a user at a first location, determining, based at least in part on a distance between the first location and a second location associated with an origin point for an input mechanism being less than a threshold distance value, that a persistent directional input has been initiated, maintaining the persistent directional input as long as touch input is continuously detected, and while the persistent directional input is maintained: monitoring a touch input vector associated with the persistent directional input, upon detecting an angular change in the touch input vector that is greater than a threshold change value, determining that a reversal input has been provided, and causing an avatar to perform a reversal action corresponding to the reversal input.

Example B. The method of example A or any of the preceding or subsequent examples, wherein a combination of the persistent directional input and the reversal input causes the avatar to perform a conventional movement action in combination with the reversal action.

Example C. The method of example A or any of the preceding or subsequent examples, wherein at least one of a direction or degree to which the avatar is moved in the conventional movement action in combination with the reversal action is dependent upon the touch input vector.

Example D. The method of example A or any of the preceding or subsequent examples, wherein the input mechanism comprises a directional pad that is used to control a movement of the avatar.

Example E. The method of example A or any of the preceding or subsequent examples, wherein the angular change in the touch input vector comprises a degree of rotational change over a predetermined period of time.

Example F. The method of example E or any of the preceding or subsequent examples, wherein the degree of rotation over a predetermined period of time comprises a rotation of greater than, or equal to, 150 degrees within the predetermined period of time.

Example G. The method of example A or any of the preceding or subsequent examples, wherein the touch input vector associated with the persistent directional input comprises a current direction in which the touch input is moving.

Example H. The method of example G or any of the preceding or subsequent examples, wherein the touch input vector associated with the persistent directional input is generated based on touch input received over a preceding period of time.

Example I. The method of example A or any of the preceding or subsequent examples, wherein the reversal action comprises a u-turn action to be performed in relation to the avatar.

Example J. A user device comprising a touch-screen display; a processor; and a memory including instructions that, when executed with the processor, cause the user device to, at least: receive, on the touch-screen display, an indication of a first touch input received from a user at a first location, determine, based at least in part on a distance between the first location and a second location associated with an origin point for an input mechanism being less than a threshold distance value, that a persistent directional input has been initiated, maintain the persistent directional input as long as touch input is continuously detected, and while the persistent directional input is maintained: monitor a touch input vector associated with the persistent directional input, upon detecting an angular change in the touch input vector that is greater than a threshold change value, determine that a reversal input has been provided, and cause an avatar to perform a reversal action corresponding to the reversal input.

Example K. The user device of example J or any of the preceding or subsequent examples, wherein the instructions comprise a virtual controller capable of facilitating interaction between the user and a software application.

Example L. The user device of example K or any of the preceding or subsequent examples, wherein the software application comprises a video game played by the user.

Example M. The user device of example L or any of the preceding or subsequent examples, wherein the avatar comprises a character object controlled by the user via the user device.

Example N. The user device of example J or any of the preceding or subsequent examples, wherein the threshold distance value is determined based on information provided by the software application.

Example O. The user device of example J or any of the preceding or subsequent examples, wherein the threshold distance value is determined based on information stored in configuration data with respect to a directional pad input mechanism.

Example P. The user device of example J or any of the preceding or subsequent examples, wherein the threshold distance value is determined based on user preferences.

Example Q. The user device of example J or any of the preceding or subsequent examples, wherein the threshold distance value is determined based on a speed associated with the first touch input.

Example R. A non-transitory computer-readable media collectively storing computer-executable instructions that upon execution cause one or more computing devices to collectively perform acts comprising: receiving, on a touch-screen display, an indication of a first touch input received from a user at a first location, determining, based at least in part on a distance between the first location and a second location associated with an origin point for an input mechanism being less than a threshold distance value, that a persistent directional input has been initiated, maintaining the persistent directional input as long as touch input is continuously detected, and while the persistent directional input is maintained: monitoring a touch input vector associated with the persistent directional input, upon detecting an angular change in the touch input vector that is greater than a threshold change value, determining that a reversal input has been provided, and causing an avatar to perform a reversal action corresponding to the reversal input.

Example S. The computer-readable media of example R or any of the preceding or subsequent examples, wherein the angular change in the touch input vector comprises a degree of rotational change over a predetermined period of time.

Example T. The computer-readable media of example S or any of the preceding or subsequent examples, wherein the persistent directional input is maintained even upon determining that a distance between the first location and a current location of the touch input is greater than the threshold distance value.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

The invention claimed is:

1. A method comprising:

receiving, an indication of a touch input detected at a first location within a touchscreen display;

identifying an initiation of a directional input based at least in part on a distance between the first location and a second location within the touchscreen display being less than a threshold distance value, wherein an origin point of the touch input is initially positioned in association with the second location;

identifying a first movement vector of the directional input while the touch input is continuously detected along a first direction;

repositioning the origin point of the touch input based on a current location of the touch input within the touch-screen display;

identifying a reversal input based on a second movement vector of the directional input identified as being along a second direction that is a reversal of the first movement vector, wherein an angular change between first movement vector and the second movement vector is greater than a threshold change value; and causing an avatar within the touchscreen display to perform a reversal action corresponding to the reversal input based on the second movement vector being identified as the reversal of the first movement vector.

2. The method of claim 1, further comprising triggering non-visual feedback to be presented in combination with the reversal action performed by the avatar within the touchscreen display.

3. The method of claim 1, wherein at least one of a direction or degree to which the avatar is moved in a first action is dependent upon the first movement vector.

4. The method of claim 1, wherein the touchscreen display includes a portion corresponding to a directional pad.

5. The method of claim 1, wherein the angular change in the first movement vector comprises a degree of rotational change over a predetermined period of time.

6. The method of claim 5, wherein the degree of rotational change over the predetermined period of time comprises a rotation that is greater than or equal to 150 degrees within the predetermined period of time.

7. The method of claim 1, wherein the first movement vector associated with the directional input comprises a speed at which the touch input is moving.

8. The method of claim 1, wherein the origin point of the touch input is repositioned when a distance between the current location of the touch input and the origin point exceeds a predetermined threshold distance value.

9. The method of claim 1, wherein the reversal action comprises a u-turn action.

10. A user device comprising:

a touchscreen display that receives an indication of a touch input detected at a first location;

a processor; and a memory including instructions executable by the processor to:

identify an initiation of a directional input based at least in part on a distance between the first location and a second location within the touchscreen display being less than a threshold distance value, wherein an origin point of the touch input is initially positioned in association with the second location;

identify a first movement vector of the directional input while the touch input is continuously detected along a first direction;

reposition the origin point of the touch input based on a current location of the touch input within the touchscreen display:

identify a reversal input based on a second movement vector of the directional input identified as being along a second direction that is a reversal of the first movement vector, wherein an angular change between the first movement vector and the second movement vector is greater than a threshold change value; and cause an avatar within the touchscreen display to perform a reversal action corresponding to the reversal input based on the second movement vector being identified as the reversal of the first movement vector.

11. The user device of claim 10, further comprising one or more feedback devices configured to be triggered to output non-visual feedback to be presented in combination with the reversal action performed by the avatar within the touch-screen display.

12. The user device of claim 10 wherein the touchscreen display includes a portion corresponding to a directional pad.

13. The user device of claim 10, wherein the avatar comprises a character object controlled by touch input.

14. The user device of claim 10, wherein the processor executes further instructions to determine the threshold distance value based on information provided by a software application.

15. The user device of claim 10, wherein the processor executes further instructions to determine the threshold distance value is determined based on information stored in configuration data with respect to a directional pad.

16. The user device of claim 10, wherein the processor executes further instructions to determine the threshold distance value based on user preferences.

17. The user device of claim 10, wherein the processor executes further instructions to determine the threshold distance value based on a speed associated with the first movement vector.

18. A non-transitory computer-readable storage media storing instructions executable by a processor to perform acts comprising:

receiving an indication of a touch input detected at a first location within a touchscreen display;

identifying an initiation of a directional input based at least in part on a distance between the first location and a second location being less than a threshold distance value identifying a first movement vector of the directional input while the touch input is continuously detected along a first direction, wherein an origin point of the touch input is initially positioned in association with the second location;

repositioning the origin point of the touch input based on a current location of the touch input within the touchscreen display;

identifying a reversal input based on a second movement vector of the directional input identified as being along a second direction that is a reversal of the first movement vector, wherein an angular change between the first movement vector and the second movement vector is greater than a threshold change value; and causing an avatar within the touchscreen display to perform a reversal action corresponding to the reversal input based on the second movement vector being identified as the reversal of the first movement vector.

19. The non-transitory computer-readable storage media of claim 18, wherein the angular change in the first movement vector comprises a degree of rotational change over a predetermined period of time.

20. The non-transitory computer-readable storage media of claim 19, further comprising instructions executable to maintain a path of the directional input.

* * * * *